B. V. GILMORE.
CONVERTIBLE ROADSTER.
APPLICATION FILED NOV. 18, 1919.
1,363,405.
Patented Dec. 28, 1920.
2 SHEETS—SHEET 1.
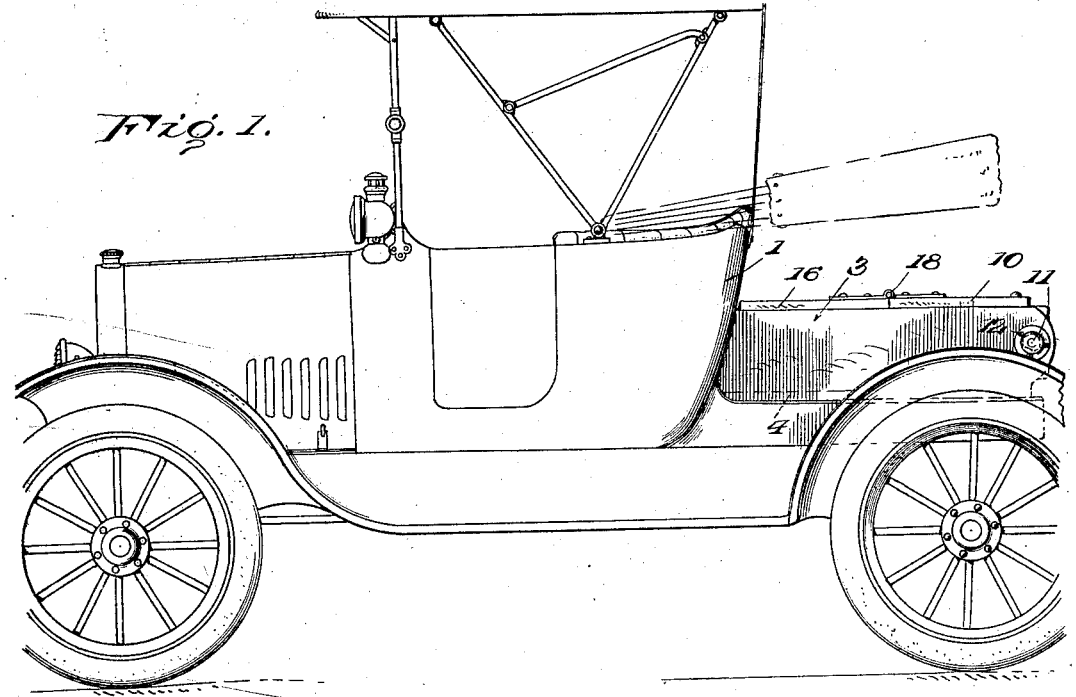
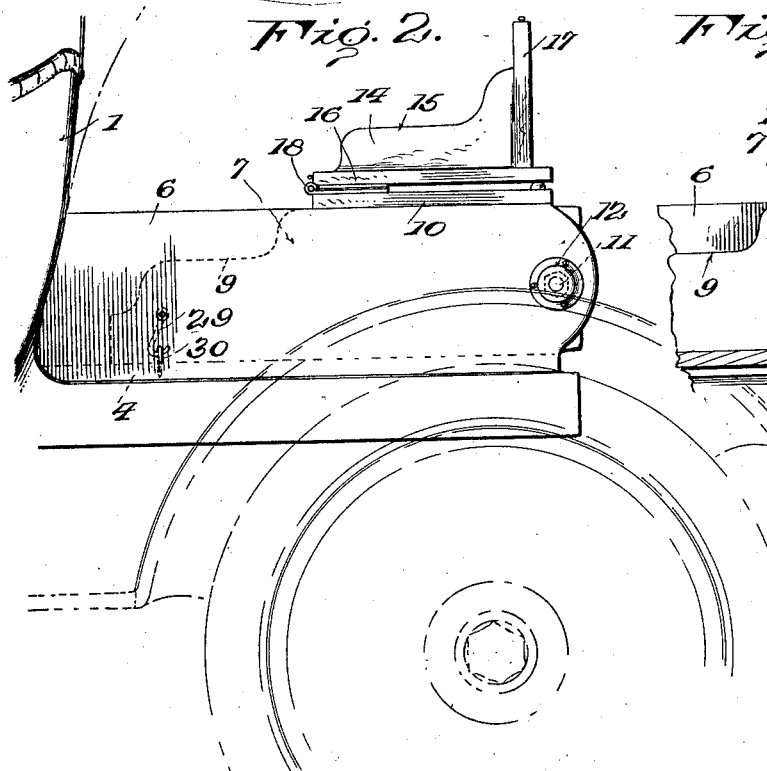
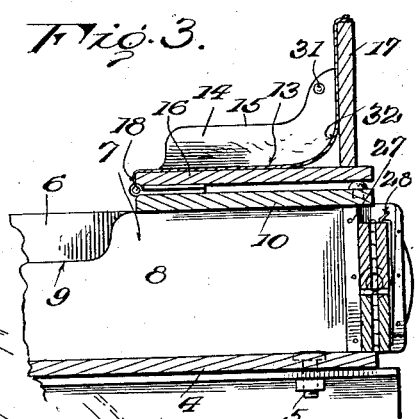
Inventor
B. V. Gilmore
by Lacy & Lacy
his Attys.

B. V. GILMORE.
CONVERTIBLE ROADSTER.
APPLICATION FILED NOV. 18, 1919.
1,363,405.
Patented Dec. 28, 1920.
2 SHEETS—SHEET 2.
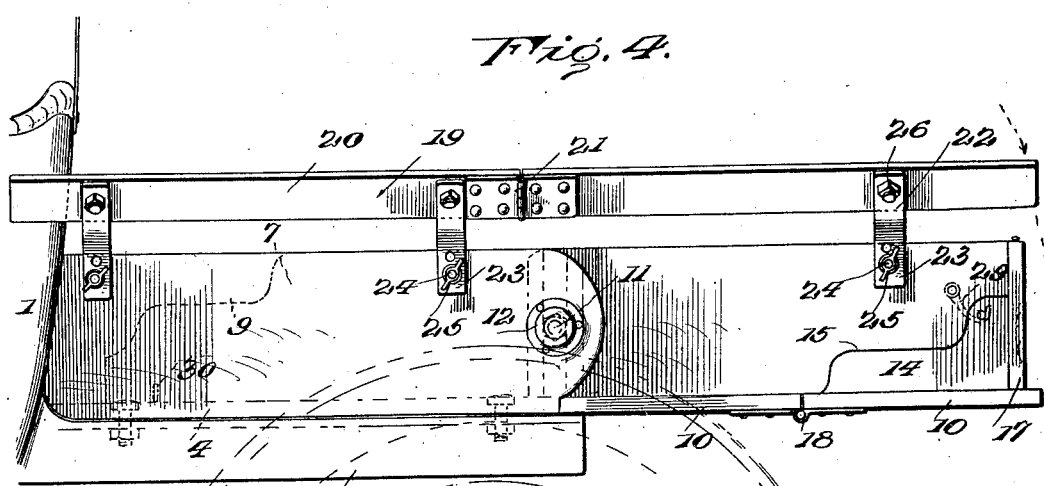
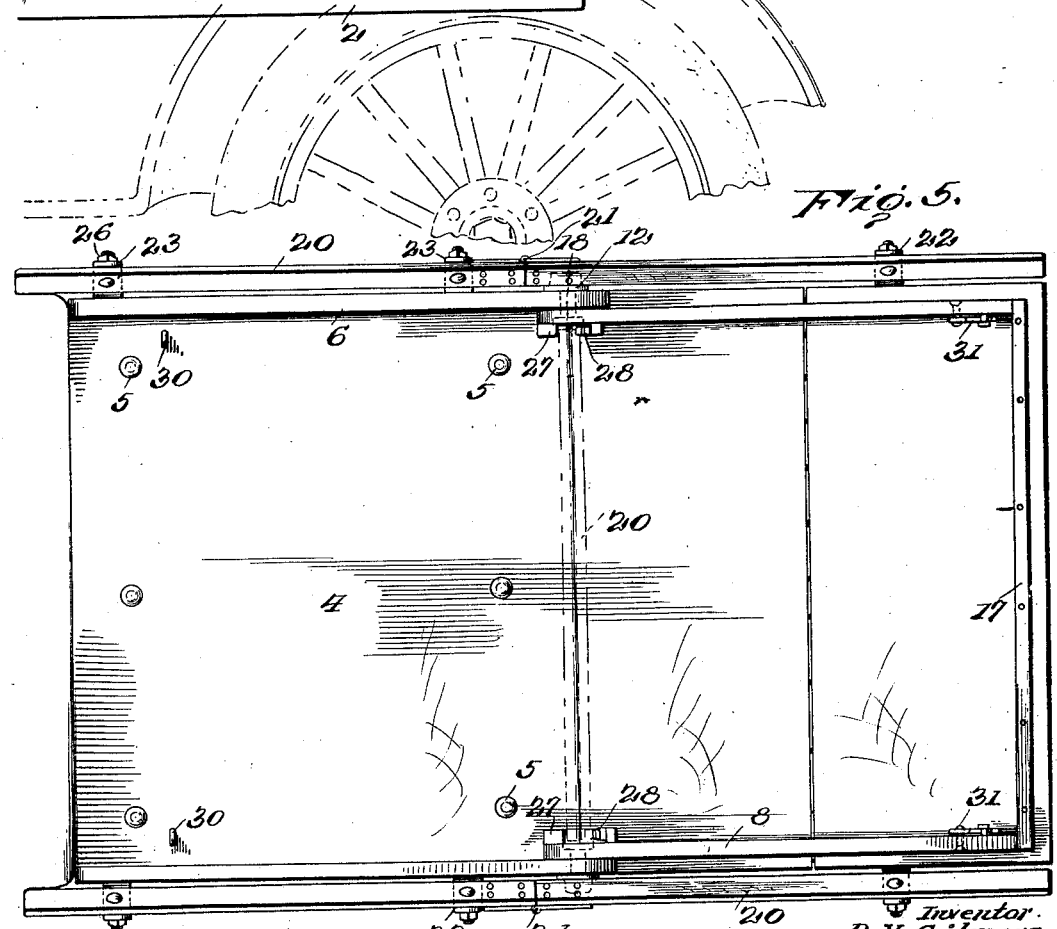

UNITED STATES PATENT OFFICE.

BENJAMIN V. GILMORE, OF GAULEY BRIDGE, WEST VIRGINIA.

CONVERTIBLE ROADSTER.

1,363,405.

Specification of Letters Patent.  Patented Dec. 28, 1920.

Application filed November 18, 1919.  Serial No. 338,795.

*To all whom it may concern:*

Be it known that I, BENJAMIN V. GILMORE, a citizen of the United States, residing at Gauley Bridge, in the county of Fayette and State of West Virginia, have invented certain new and useful Improvements in Convertible Roadsters, of which the following is a specification.

This invention relates to convertible automobile tonneaus and has for its primary object to provide a tonneau, for runabouts, which may be readily converted to provide a seat for additional passengers or to provide a truck body so that the owner of a machine equipped with the tonneau may use the same for business purposes and when desired convert his machine into a pleasure car having no resemblance to a truck.

Another object of the invention is to provide a convertible tonneau capable of serving the purposes above stated and so constructed that when its component parts are adjusted to serve any one purpose as for example a seat or a truck, the fact that these parts may be adjusted to convert the tonneau for another use will not be readily apparent so that, what is the chief consideration, the truck feature of the tonneau will not be apparent when the tonneau is converted for the accommodation of passengers.

Another object of the invention is to provide a convertible tonneau which may be applied to take the place of the ordinary tonneau of standard makes of runabouts as for example the Ford car and which may be manufactured at a reasonable cost.

A further object of the invention is to provide in connection with the tonneau, side boards for use when the tonneau is converted into a truck body, which side boards are so constructed that when not in use as suggested they may be stored away in a manner to adapt them to constitute the rear wall or side of the tonneau so that under these conditions they are not only kept out of the way but in addition they serve a useful purpose.

Another object of the invention is to so construct the tonneau that when the same is converted to constitute a truck body, one section thereof may be dropped if desired, when loading or unloading the truck so as to render the interior of the truck body more accessible.

In the accompanying drawings:

Figure 1 is a side elevation of the tonneau embodying the present invention installed upon a Ford runabout;

Fig. 2 is a side elevation of the tonneau converted for passenger use;

Fig. 3 is a vertical longitudinal sectional view through the tonneau with the component parts thereof adjusted as shown in Fig. 2;

Fig. 4 is a view similar to Fig. 2 illustrating the tonneau converted into a truck body;

Fig. 5 is a top plan view of the tonneau converted as shown in Fig. 4.

In the drawings the numeral 1 indicates in general the body of a Ford runabout and 2 the rear portion of the chassis frame from which the ordinary tonneau has been removed.

The improved tonneau embodying the present invention comprises a relatively fixed body section which is indicated in general by the numeral 3 and which consists of a bottom or floor 4 which is bolted or otherwise secured as indicated by the numeral 5, to the portion 2 of the chassis frame as clearly shown in Figs. 3, 4 and 5 of the drawings, and sides 6 which upstand from the said bottom or floor 4. The space between these sides at the front is closed by the rear side of the seat of the machine but the section 3 is open at its rear except under conditions which will presently be explained. This section 3 constitutes the body of the tonneau when the same as a whole is converted to resemble the ordinary tonneau of the runabout or when converted for passenger use, and it likewise serves as the forward part of the truck body when the tonneau is converted for this latter use. In addition to the fixed section 3, the tonneau includes a section which is indicated in general by the numeral 7 and which is to constitute a portion of the rear part of the truck body when the tonneau as a whole is so converted, and this section comprises sides which are indicated by the numeral 8 and which have their corresponding longitudinal edge portions preferably cut away as at 9 for a purpose to be presently made apparent. These sides 8 are connected by a cross piece 10 preferably secured to the said longitudinal edges of the sides 8 and arranged, when the section as a whole is adjusted to one position, to constitute a portion of the floor of the truck, and when the section is adjusted to another position to constitute a support for that section of the tonneau which is to serve under such conditions as the seat. In connecting this section 7 of the tonneau with the relatively fixed section 3, bolts 11 are fitted through the rear ends of the sides 6 of the said fixed section and through the ends of the sides 8 of the said section 7, these ends of the sides 8 constituting the rear ends when the tonneau as a whole is converted to closed form or for passenger use, and constituting the forward ends when the tonneau as a whole is converted for truck use. In the former instance the sides 8 will extend beside the inner faces of the sides 6 of the fixed section 3 and be covered and concealed thereby, and in the latter instance will constitute rearward extensions of these said sides 6. In order to effectually conceal the bolts 11 or the nuts thereon, cap plates 12 may be secured to the outer faces of the sides 6 to cover the said bolts or their nuts as clearly shown in Fig. 2 of the drawings.

The tonneau further comprises a third section which is indicated in general by the numeral 13 and which in one adjustment of the parts is to constitute the passenger seat; in another adjustment is to constitute the rear portion of the truck body, and in a third position of adjustment is to constitute a portion of the cover or top of the tonneau. This section 13 comprises sides 14 one longitudinal edge of each of which is cut away along curved lines as at 15 so as to match the portions 9 of the sides 8 of the section 7. This section further comprises a cross piece 16 which is to comprise the seat bottom when the section serves the purpose of a seat; which is to comprise a portion of the floor of the truck body when the section is in another position of adjustment, and which in a third position of the parts is to constitute a portion of the cover or top of the closed tonneau. The said section 13 further comprises a cross member 17 which extends between the rear ends of the sides 14 and is to constitute the rear wall of the truck body in one adjustment of the parts and the back of the seat in another adjustment of the parts.

The cross member 16 of the section 13 of the tonneau is connected by means of hinges 18 with the cross member 10 of the section 7 as clearly shown in Figs. 1, 2 and 3 of the drawings.

As before stated, members are provided constituting side boards when the tonneau is converted into a truck body, these members being designed to serve, when not in use as side boards, as the rear end wall of the tonneau when the tonneau is closed as shown in Fig. 1 or when it is converted to provide a passenger seat as shown in Fig. 3. Each of these side boards, indicated in general by the numeral 19 comprises a pair of sections 20 connected end to end by means of hinges 21, the sections being of equal length so that when folded upon their hinges their ends will register. When the members 19 are employed as side boards, they are supported by means of suitable brackets 22 and each of these brackets includes an attaching portion 23 removably secured to the side members 6 or 8 of the sections 3 or 7 as the case may be by means of bolts 24 having wing nuts 25. Bolts 26 are likewise passed through the supporting portions or upper ends of the brackets 22 and through the sections 20 of the side boards 19 so that the boards will be supported in the manner shown in Figs. 4 and 5 of the drawings. Spaced cleats 27 are secured upon the inner faces of the side members 8 of the section 7 at the pivoted ends of these said members, and these spaced cleats serve as pockets to receive the ends of the folded side board members 19 in the manner clearly shown in Fig. 3 of the drawings and indicated in dotted lines in Fig. 5 so that when the said members are folded upon their hinges 21 they may be dropped into position to extend between the pivoted ends of the side members 8 of the section 7 and will serve as a closure for the rear end of the tonneau when the tonneau is either completely closed as shown in Fig. 1 or is converted to provide a passenger seat as shown in Fig. 3. When so disposed, the folded members will rest edgewise one upon the other, and in order that they may be held in place, suitable spring latches 28 may be provided, these latches being mounted upon their respective cleats 27 and being arranged to engage over the upper edge of the upper one of the members 19.

Hooks 29 are pivoted upon the inner faces of the side members 8 of the section 7 at the free ends of the said members and thus hooks are selectively engageable with eyes or keepers 30 upon the floor 4 or with studs or similar keepers 31 upon the inner faces of the side members 14 of the section 13, the former as shown in Fig. 2 and the latter as shown in Figs. 4 and 5.

By reference to Fig. 1 of the drawings it will be observed that the sections 7 and 13 may be swung to such position that the cross pieces 10 and 16 will constitute the top or cover of the tonneau, the members 19 in their folded condition constituting the rear wall of the tonneau. When it is desired to accommodate extra passengers, the section 13 may be swung up from the position shown in Fig. 1 to the positions shown in Figs. 2 and 3 of the drawings in which position the cross member 16 will be supported above and upon the cross member 10, the member 16 then constituting the bottom of the seat, the member 17 the back thereof, and the portions 14 the arm rests. When the parts are so adjusted, the hooks 29 will be engaged with the keepers 30 so as to prevent backward tilting or overturning of the section 7. If desired a lining member of any suitable material, indicated by the numeral 32, may be provided in connection with the members 16 and 17 to better adapt these members to serve the purpose of a seat.

When it is desired to convert the tonneau into a truck body, the hooks 29 may be disengaged from the keepers 30 and the sections 7 and 13 then swung rearwardly about the bolts 11 as pivots, the section 13 being swung upon its hinges 18 to bring it into horizontal alinement with the section 7 as clearly shown in Fig. 4 of the drawings. With the sections thus adjusted, the hooks 29 are engaged with the keepers 31 so that the two sections 7 and 13 are rigidly connected and the section 13 will be prevented from dropping down. The section 7 is braced in horizontal position by the forward end portion of its cross member 10 resting upon the portion 2 of the chassis frame of the runabout which frame projects a short distance rearwardly beyond the floor 4 of the section 3. Of course, when the parts are adjusted to this position, the members 19 are to be removed from the pockets comprising the cleats 27 and when unfolded are to be mounted upon the brackets 22 which may be readily secured in place by the bolts 24 and 26. It will further be apparent that if desired, when the parts are in adjustment to form a truck body, the hooks 29 may be disengaged from the keepers 31 and the section 13 may then be allowed to drop or swing downwardly so that more ready access may be had to the interior of the truck body.

Having thus described the invention, what is claimed as new is:

1. A convertible automobile tonneau comprising a relatively fixed body section having a bottom and sides, a section foldably connected therewith and including sides and a cross member arranged in one position of adjustment of the last mentioned section to constitute an extension of the bottom of the first mentioned section and in another position of adjustment of the said second mentioned section to constitute a cover member for the said first mentioned section, and a third section foldably connected with the second mentioned section and comprising sides and a cross member, the latter, in one position of adjustment of the third mentioned section completing the cover for the first mentioned section in conjunction with the cross member of the second mentioned section; in another position of adjustment of the third mentioned section constituting a seat; and, in another position of adjustment of the third mentioned section constituting in connection with the cross member of the second mentioned section the bottom of a truck body.

2. A convertible automobile tonneau comprising a relatively fixed body section having a bottom and sides, a section foldably connected therewith and including sides and a cross member arranged in one position of adjustment of the last mentioned section to constitute an extension of the bottom of the first mentioned section and in another position of adjustment of the said second mentioned section to constitute a cover member for the said first mentioned section, and a third section foldably connected with the second mentioned section and comprising sides and a cross member, the latter in one position of adjustment of the third mentioned section completing the cover for the first mentioned section in conjunction with the cross member of the second mentioned section; in another position of adjustment of the third mentioned section constituting a seat; and, in another position of adjustment of the third mentioned section constituting in connection with the cross member of the second mentioned section the bottom of a truck body, the sides of the second and third mentioned sections in the second and third mentioned adjustments of the said sections constituting the sides of the truck body.

3. A convertible automobile tonneau comprising a relatively fixed body section, a section having sides and a cross member extending therebetween, the second mentioned section having its sides pivotally connected with the sides of the relatively fixed body section whereby the second mentioned section may be swung to such position that its cross member will constitute a cover member for the said relatively fixed body section or may be swung to position such that the said cross member will constitute an extension of the bottom of the relatively fixed body section, and a third section including sides and a cross member extending therebetween, the cross member of the third mentioned section being hingedly connected with the cross member of the second mentioned section whereby it may be folded to position such that the cross member of the third mentioned section will, in conjunction with the cross member of the second mentioned section, complete the cover for the relatively fixed body section, or swung to such position that the cross member of the said third mentioned section will constitute a seat bottom supported upon the cross member of the second mentioned section, or may be swung to such position, together with the second mentioned section, that the second and third mentioned sections will be substantially in horizontal alinement and in which position the cross members of the second and third mentioned sections will constitute continuations of the bottom of the relatively fixed body section to form the floor of a truck body, the sides of all three sections constituting the sides of the truck body.

4. A convertible automobile tonneau comprising a relatively fixed body section, a section having sides and a cross member extending therebetween, the second mentioned section having its sides pivotally connected with the sides of the relatively fixed body section whereby the second mentioned section may be swung to such position that its cross member will constitute a cover member for the said relatively fixed body section or may be swung to position such that the said cross member will constitute an extension of the bottom of the relatively fixed body section, and a third section including sides and a cross member extending therebetween, the cross member of the third mentioned section being hingedly connected with the cross member of the second mentioned section whereby it may be folded to position such that the cross member of the third mentioned section will, in conjunction with the cross member of the second mentioned section, complete the cover for the relatively fixed body section, or swung to such position that the cross member of the said third mentioned section will constitute a seat bottom supported upon the cross member of the second mentioned section, or may be swung to such position, together with the second mentioned section, that the second and third mentioned sections will be substantially in horizontal alinement and in which position the cross members of the second and third mentioned sections will constitute continuations of the bottom of the relatively fixed body section to form the floor of a truck body, the sides of all three sections constituting the sides of the truck body, and a common means for holding the second mentioned section in its first stated position of adjustment and for holding the third mentioned section in its third stated position of adjustment.

5. A convertible automobile tonneau comprising a relatively fixed body section, and sections connected therewith and selectively adjustable to positions to form a closure for the body, to form a seat, and to form an extension of the body section and providing in connection therewith a truck body, side boards for the truck body each comprising foldably connected sections, means for supporting the side boards detachably upon the sides of the several sections when the sections are adjusted to form a truck body, and means for supporting the folded side boards in position to constitute the rear wall of the tonneau when the sections are adjusted to form a closure for the body section or to form a seat.

In testimony whereof I affix my signature.

BENJAMIN V. GILMORE. [L. S.]